(12) United States Patent
Hilton et al.

(10) Patent No.: US 11,104,315 B2
(45) Date of Patent: Aug. 31, 2021

(54) BRAKE SYSTEM

(75) Inventors: Christopher David Hilton, Berkshire (GB); Angus Rutherford Lyon, Oxfordshire (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 0 days.

(21) Appl. No.: 14/126,851

(22) PCT Filed: Jun. 8, 2012

(86) PCT No.: PCT/IB2012/052915
§ 371 (c)(1),
(2), (4) Date: Mar. 24, 2014

(87) PCT Pub. No.: WO2012/172464
PCT Pub. Date: Dec. 20, 2012

(65) Prior Publication Data
US 2014/0203624 A1    Jul. 24, 2014

(30) Foreign Application Priority Data

Jun. 17, 2011    (GB) .................................... 1110288

(51) Int. Cl.
*B60T 8/64*    (2006.01)
*B60T 13/58*   (2006.01)
(Continued)

(52) U.S. Cl.
CPC .............. *B60T 13/586* (2013.01); *B60L 7/08* (2013.01); *B60L 7/26* (2013.01); *B60L 15/2009* (2013.01);
(Continued)

(58) Field of Classification Search
CPC ......... B60T 2270/602; B60T 2270/604; B60L 7/26; B60L 7/18; B60L 3/102; B60L 3/108; B60K 7/0007
See application file for complete search history.

(56) References Cited

U.S. PATENT DOCUMENTS 5,253,929 A * 10/1993 Ohori ...................... B60T 7/042
                                                          188/156
5,326,158 A *  7/1994 Ohori .................... B60T 13/585
                                                          188/156
(Continued)

FOREIGN PATENT DOCUMENTS

DE    102006055799 A1    5/2008
DE    102008057529 A1    5/2010
(Continued)

OTHER PUBLICATIONS

European Patent Office; International Search Report; dated Dec. 20, 2012; World International Property Organization; Rijswijk.
(Continued)

*Primary Examiner* — Nicholas J Lane
(74) *Attorney, Agent, or Firm* — Nolte Lackenbach Siegel (57) ABSTRACT

A brake arrangement for a vehicle comprising a braking system arranged to vary hydraulic or pneumatic brake pressure that is arranged to apply a pressure to a brake caliper; an electric motor arranged to generate a braking torque that is applied to a first wheel when the electric motor is placed in a braking mode of operation, wherein the electric motor is arranged to vary brake torque generated when the electric motor is in the braking mode dependent upon a predetermined operating condition of the braking system.

6 Claims, 6 Drawing Sheets

(51) Int. Cl.
*B60T 1/10* (2006.01)
*B60L 15/20* (2006.01)
*B60L 7/26* (2006.01)
*B60L 7/08* (2006.01)
*B60T 1/06* (2006.01)
*B60T 8/176* (2006.01)

(52) U.S. Cl.
CPC ............... *B60T 1/065* (2013.01); *B60T 1/10* (2013.01); *B60T 8/176* (2013.01); *B60T 13/585* (2013.01); *B60L 2220/44* (2013.01); *B60L 2220/46* (2013.01); *B60L 2240/423* (2013.01); *B60L 2250/26* (2013.01); *B60T 2270/602* (2013.01); *B60T 2270/604* (2013.01); *Y02T 10/64* (2013.01); *Y02T 10/72* (2013.01)

(56) References Cited

U.S. PATENT DOCUMENTS

| | | | |
|---|---|---|---|
| 5,895,100 A * | 4/1999 | Ito | B60L 7/26 303/152 |
| 6,244,674 B1 | 6/2001 | Kuno et al. | |
| 7,922,265 B1 | 4/2011 | Daniel | |
| 2003/0168266 A1 | 9/2003 | Sasaki et al. | |
| 2004/0054450 A1 | 3/2004 | Nakamura et al. | |
| 2006/0125317 A1* | 6/2006 | Kokubo et al. | 303/152 |
| 2006/0131956 A1* | 6/2006 | Matsuura | B60K 6/445 303/152 |
| 2006/0220452 A1* | 10/2006 | Emmerich | B60K 6/48 303/152 |
| 2006/0220453 A1* | 10/2006 | Saito | B60L 7/26 303/152 |
| 2008/0100129 A1* | 5/2008 | Lubbers | 303/113.1 |
| 2008/0100132 A1 | 5/2008 | Jeon et al. | |
| 2010/0036577 A1 | 2/2010 | Kodama et al. | |
| 2010/0102622 A1* | 4/2010 | Favaretto | 303/152 |
| 2010/0187901 A1* | 7/2010 | Sonoda | B60L 7/10 303/11 |
| 2010/0292882 A1* | 11/2010 | Murata | B60L 7/18 701/22 |
| 2011/0049973 A1 | 3/2011 | Wuerth et al. | |
| 2011/0304198 A1* | 12/2011 | Cottrell | 303/2 |

FOREIGN PATENT DOCUMENTS

| | | |
|---|---|---|
| EP | 1491386 A1 | 12/2004 |
| WO | 03066398 A1 | 8/2003 |
| WO | 2010056844 A1 | 5/2010 |

OTHER PUBLICATIONS

European Patent Office; Written Opinion of the International Search Authority; dated Dec. 17, 2013; World Intellectual Property Organization; Rijswijk.
Intellectual Property Office; Combined Search and Examination Report; dated Jul. 25, 2011; Intellectual Prope Office; South Wales.
Intellectual Property Office; Search Report; dated Jul. 25, 2011; Intellectual Property Office; South Wales.

* cited by examiner

BRAKE SYSTEM

The present invention relates to a brake arrangement, in particular a brake arrangement having a regenerative braking capability.

With increased interest being placed in environmentally friendly vehicles there has, perhaps unsurprisingly, been a corresponding increase in interest in the use of electric vehicles.

Electric vehicles typically use an electric motor to provide both drive for the vehicle and regenerative braking for stopping the vehicle. To effect regenerative braking rotary motion of drive wheels connected to an electric motor is converted into electric energy, which involves consumption of kinetic energy and provides a braking force to the drive wheels. The regenerated electric energy can be stored in a device such as a battery and subsequently used to provide power to the electric motor.

However, currently it is impractical for electric vehicles to provide full brake torque on all wheels through regenerative braking alone. This gives rise to a need for an additional braking system, for example a hydraulic or pneumatic friction braking system.

Further, vehicles having an internal combustion engine that are retrofitted with an electric motor drive system will have an existing hydraulic or pneumatic friction braking system that may be supplemented with electric motor regenerative braking.

However, it is desirable to keep the single pedal brake operation of current cars, with arbitration between regenerative and friction systems carried out independently of the driver. Additionally, when possible, it is desirable to perform regenerative braking to allow capture of electrical energy.

For this reason braking systems have been devised which are de-coupled from the drivers pedal. Arbitration between different braking systems is then carried out by a control unit using only one brake demand input. These systems combine conventional friction systems with regenerative brake systems.

However, the use of a dedicated control unit results in additional cost and complexity. Additionally, the use of a control unit to coordinate a friction brake system with a regenerative brake system requires communication between the control unit and the vehicle's ABS unit in order to address synchronisation issues between friction braking and regenerative braking resulting from the activation of an antilock braking system associated with the friction braking system.

It is desirable to improve this situation.

In accordance with an aspect of the present invention there is provided a braking arrangement, a vehicle and a method according to the accompanying claims.

This provides the advantage of allowing regenerative braking torque provided by an electric motor to be based upon braking torque provided by a friction braking system. Additionally, the regenerative braking torque can be varied based upon fluctuations in braking torque of a friction braking system arising from the activation of an antilock braking system.

The present invention will now be described, by way of example, with reference to the accompanying drawings, in which.

Figure 1:
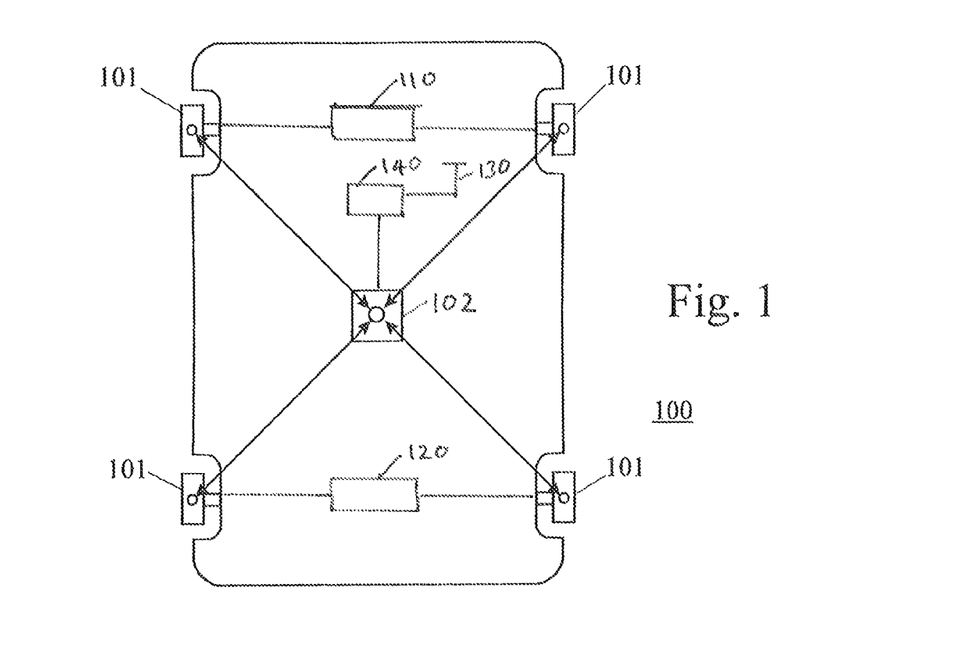
FIG. 1 illustrates a vehicle according to an embodiment of the present invention.

FIG. 1 illustrates a vehicle 100, for example a car or lorry, having four wheels 101, where two wheels are located in the vehicle's forward position in a near side and off side position respectively. Similarly, two additional wheels are located in the vehicle's aft position in near side and off side positions respectively, as is typical for a conventional car configuration. However, as would be appreciated by a person skilled in the art, the vehicle may have any number of wheels.

For the purposes of the present embodiment, incorporated within each rear wheel 101 is an in-wheel electric motor, where the in-wheel electric motor is described in detail below, with the front two wheels being arranged to be driven by an internal combustion engine 110.

Although the current embodiment describes the vehicle having an in-wheel electric motor associated with each rear wheel 101 with the front wheels being driven by an internal combustion engine 110, as would be appreciated by a person skilled in the art other combinations may be utilized. For example, for a four wheeled vehicle the front two wheels may have associated in-wheel motors with the rear two wheels optionally being driven by an internal combustion engine. Indeed, any number of the vehicle's wheels may have an associated in-wheel electric motor where drive may or may not be provided to any of the wheels from an internal combustion engine.

Additionally, the vehicle includes a battery 120 for providing a power source for the in-wheel electric motors.

For the purpose of illustration, the in-wheel electric motor is of the type having a set of coils being part of the stator for attachment to the vehicle, radially surrounded by a rotor carrying a set of magnets for attachment to a wheel. However, as would be appreciated by a person skilled in the art, the present invention is applicable to other types of electric motors.

Figure 2:
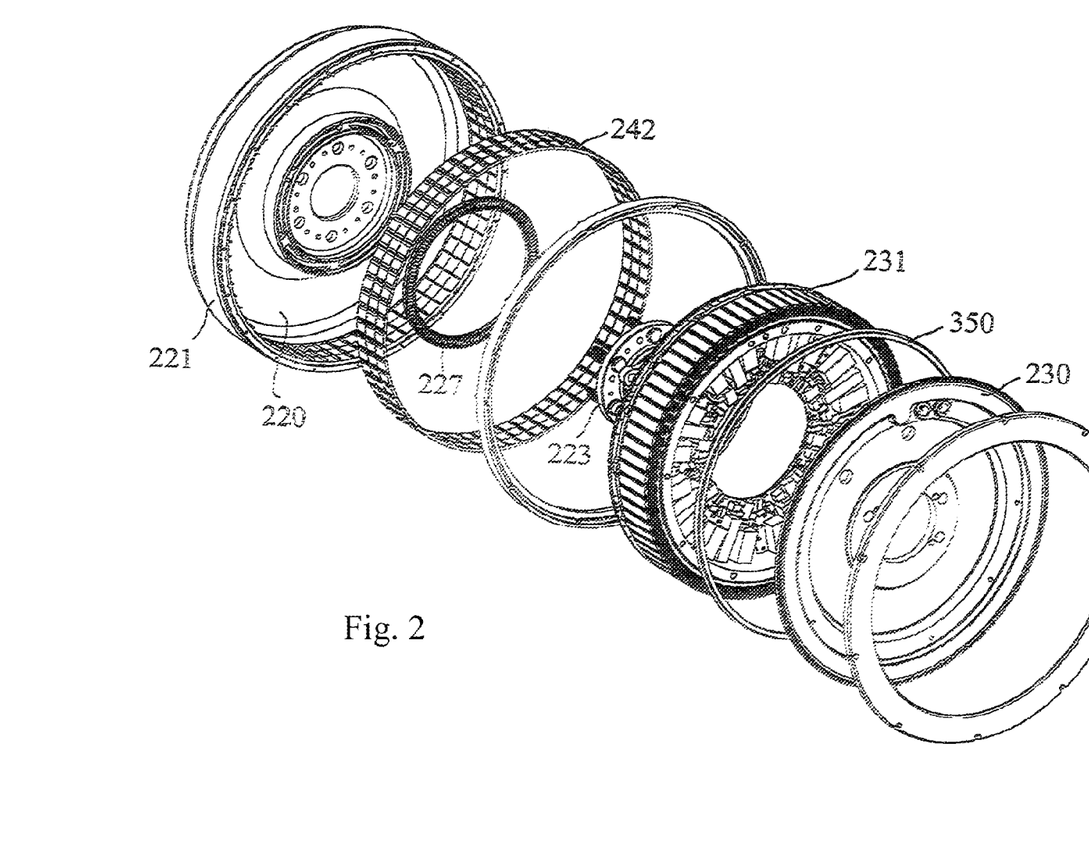
FIG. 2 illustrates an exploded view of an electric motor as used in an embodiment of the present invention.

As illustrated in FIG. 2, the in-wheel electric motor 40 includes a stator 252 comprising a rear portion 230 forming a first part of the housing of the assembly, and a heat sink and drive arrangement 231 comprising multiple coils and electronics to drive the coils. The coil drive arrangement 231 is fixed to the rear portion 230 to form the stator 252 which may then be fixed to a vehicle and does not rotate during use. The coils themselves are formed on tooth laminations which together with the drive arrangement 231 and rear portion 230 form the stator 252.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 cooperate with the magnets 242 arranged around the inside of the cylindrical portion 221 of the rotor 240 to cause the rotor 240 to rotate.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Figure 3:
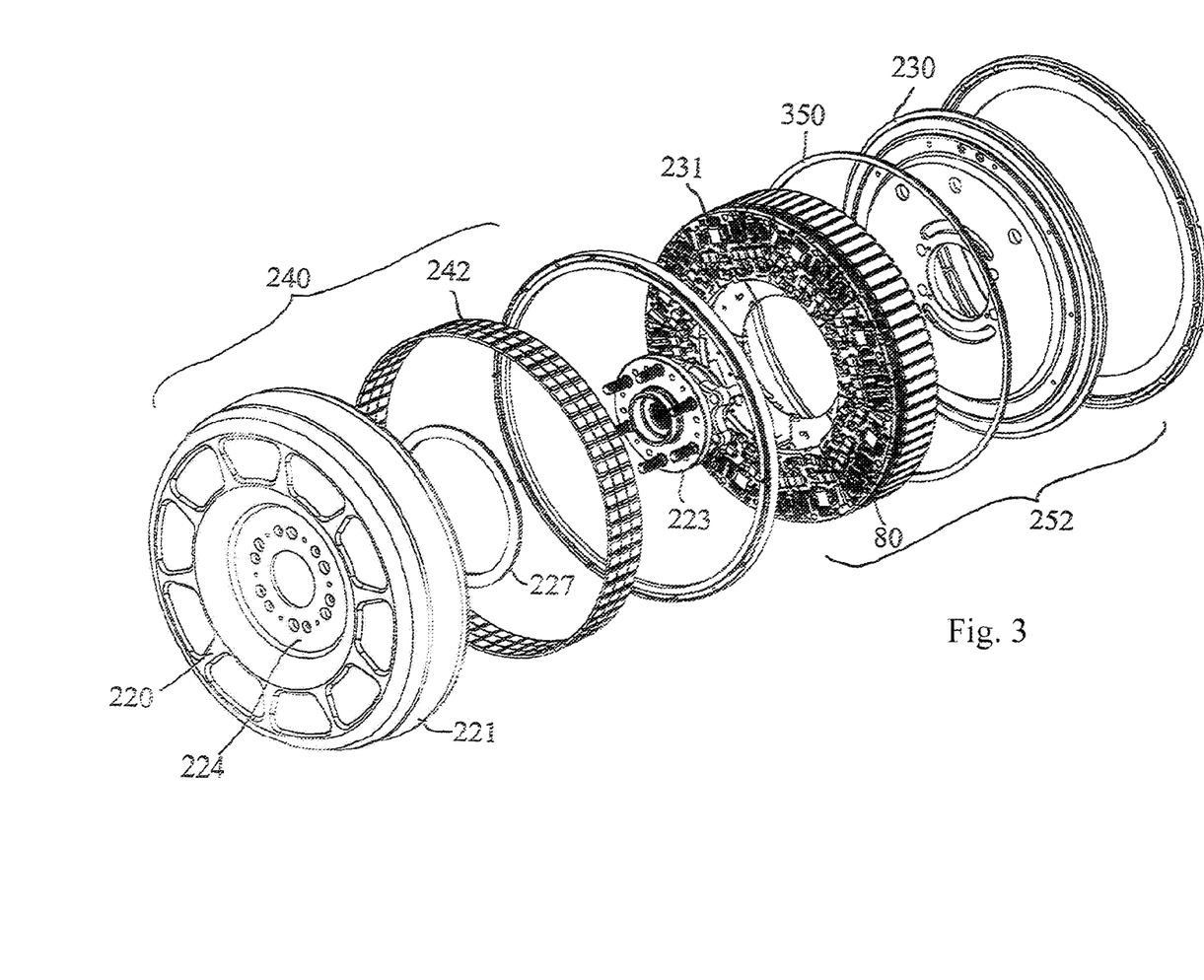
FIG. 3 illustrates an exploded view of the electric motor shown in FIG. 2 from an alternative angle.

FIG. 3 shows an exploded view of the same assembly as FIG. 2 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

Additionally shown in FIG. 2 are circuit boards 80 carrying control electronics, otherwise known as motor drive controllers or inverters.

A V shaped seal 350 is provided between the circumferential wall 221 of the rotor and the outer edge of the stator housing 230.

The rotor also includes a focussing ring and magnets 227 for rotor position sensing, which in conjunction with sensors mounted on the stator allows for an accurate position determination of the rotor relative to the stator to be made.

Figure 4:
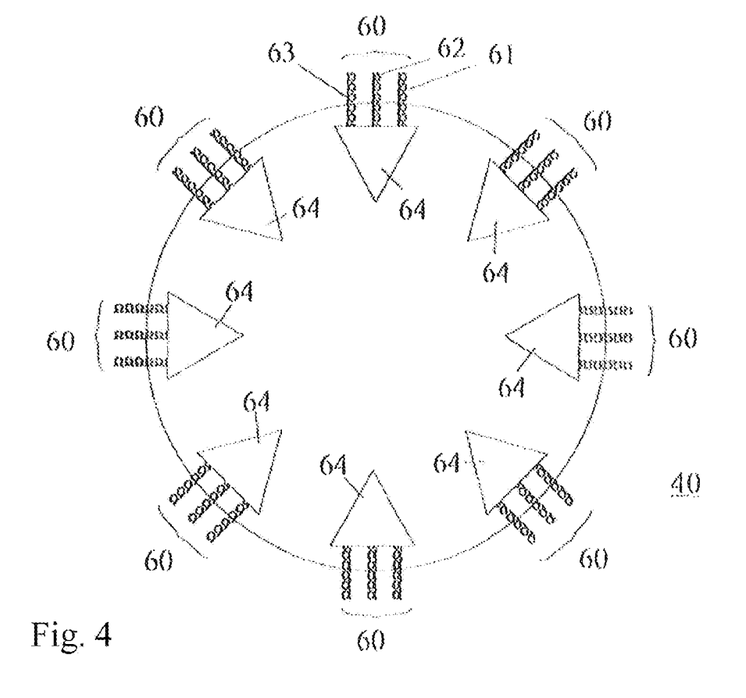
FIG. 4 illustrates an example arrangement of coil sets for an electric motor according to an embodiment of the present invention.

FIG. 4 schematically shows an example of an electric motor 40 in accordance with an embodiment of the present invention.

The motor 40 in this example includes 8 coil sets 60 with each coil set 60 having three coil sub-sets 61, 62, 63 that are coupled to a respective control device 64, where each control device 64 and respective coil sub-sets form a three phase logical or sub electric motor that can be controlled independently of the other sub motors. The control devices 64 drive their respective sub motor with a three phase voltage supply, thereby allowing the respective coil sub-sets to generate a rotating magnetic field. Although the present embodiment describes each coil set 60 as having three coil sub-sets 61, 62, 63, the present invention is not limited by this and it would be appreciated that each coil set 60 could have two or more coil sub-sets. Equally, although the present embodiment describes an electric motor having eight coil sets 60 (i.e. eight sub motors) the motor can have any number of coil sets with associated control devices.

Each control device includes a three phase bridge inverter which, as is well known to a person skilled in the art, contains six switches. The three phase bridge inverter is coupled to the three subset coils of a coil set 60 to form a three phase electric motor configuration. Accordingly, as stated above, the motor includes eight three phase sub-motors, where each three phase sub-motor includes a control device 64 coupled to the three sub-set coils of a coil set 60.

Each three phase bridge inverter is arranged to provide PWM voltage control across the respective coil sub-sets 61, 62, 63 to provide a required torque for the respective sub-motors.

For a given coil set the three phase bridge switches of a control device 64 are arranged to apply a single voltage phase across each of the coil sub-sets 61, 62, 63.

Although the in-wheel electric motor described in the present embodiment includes a plurality of logical sub-motors, as person skilled in the art would appreciate the electric motor may be of a conventional design without the use of logical sub-motors.

In this embodiment, each control device 64 is substantially wedge-shaped. This shape allows multiple control devices 64 to be located adjacent each other within the motor, forming a fan-like arrangement.

Figure 5:
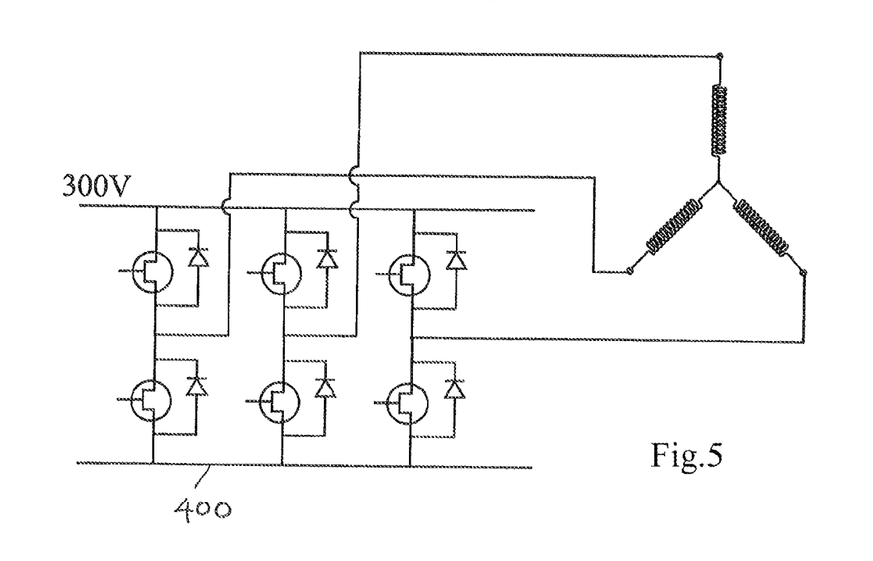
FIG. 5 illustrates a circuit diagram of a switching arrangement.

The control device 64 switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and form a leg of the three phase bridge circuit. FIG. 5 illustrates an example of an three phase bridge circuit 400 coupled to three coil subsets.

Figure 6:
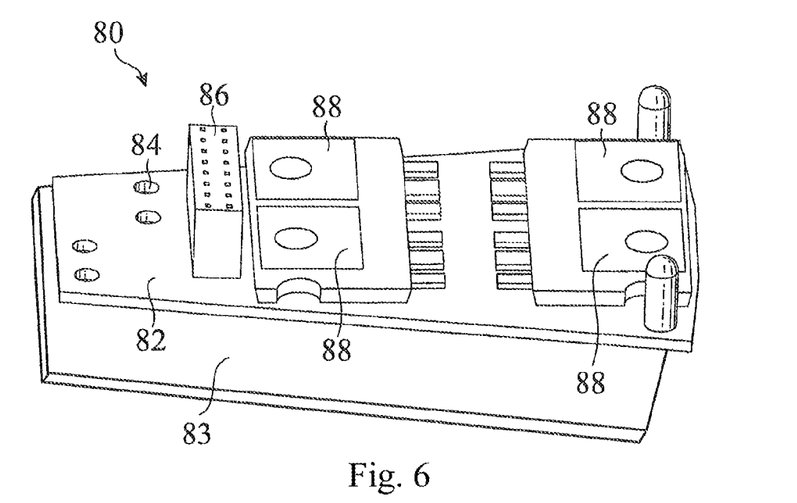
FIG. 6 illustrates a control device in accordance with an embodiment of the present invention.

FIG. 6 shows an example of a control device 80 in accordance with an embodiment of this invention.

The control device 80 includes a first circuit board 83 and a second circuit board 82. Preferably the second board 82 is arranged to overlay the first circuit board 83.

The first circuit board 83 includes the plurality of switches that are arranged to apply an alternating voltage across the respective coil sub-sets.

As described above, the plurality of switches are configured to form an n-phase bridge circuit. Accordingly, as is well known to a person skilled in the art, the number of switches will depend upon the number of voltage phases to be applied to the respective sub motors. In the present embodiment, in which the control devices and coil sub-sets are configured to form a three phase motor, the first circuit board 83 of the respective control devices include six switches. Although the current design shows each sub motor having a three phase construction, the sub motors can be constructed to have two or more phases.

The wires (e.g. copper wires) of the coil sub-sets can be connected directly to the switching devices as appropriate.

The second circuit board 82 includes a number of electrical components for controlling the operation of the switches mounted on the first circuit board 83. Examples of electrical components mounted on the second circuit board 82 include control logic for controlling the operation of the switches for providing PWM voltage control and interface components, such as a CAN interface chip, for allowing the control device 80 to communicate with devices external to the control device 80, such as other control devices 80 or a master controller. Typically the second control board 82 will communicate over the interface to receive torque demand requests and to transmit status information.

As mentioned above, the second circuit board 82 is arranged to be mounted on top of the first circuit board 83, where the first circuit board 83 and the second circuit board include means for being mounted within the motor 40, for example, adjacent to the coil sub-set which they control, directly to a cooling plate. In the illustrated example, these means include apertures 84 through which screws or such-like can pass. In this example, the first circuit board 83 and the second circuit board 82 are substantially wedge-shaped. This shape allows multiple control devices 80 to be located adjacent each other within the motor, forming a fan-like arrangement. By separating the control logic from the switches this has the advantage of thermally isolating the control logic from the switches while also minimizing the impact of any electrical noise generated by the switches.

As is well known to a person skilled in the art, the transformation of 3 phase stator currents into a two phase orthogonal vector is performed using a Clarke transform. A further transformation is then required to relate the components of a stationary stator frame into the rotating reference frame of a rotor using a Park transform.

To perform the Park transform, accurate angular position of the rotor is required, which is performed using an active position sensor mounted on each of the circuit boards. For the purposes of the present invention, a Hall sensor is used as a position sensor, where the hall sensor is arranged to generate an electrical signal dependent upon the relative position of the focusing ring and magnets 227, which is mounted on the rotor 240. To determine the direction that the rotor is turning in, the control device 80 preferably have two position sensors that are offset by a predetermined angle, for example 90 degrees, so that the changes in signal from each of the position sensors can be analyzed to determine both the relative position of the rotor 240 and the direction of rotation of the rotor is. As is well known to a person skilled in the art, the angle position information is based on phase angle of the current in coil windings of a sub motor. To allow each control device 80, and hence each sub motor, to operate independently of each other each control device 80 has their own set of position sensors. However, a single set of position sensors could be used per in-wheel electric motor. By having a set of position sensors mounted on a number of the control devices this has the advantage of providing redundancy should a fault occur with one set of position sensors.

Although the present embodiment incorporates an active sensor, other forms of position sensor could be used, for example inductive position sensors that include a magnet and coil mounted adjacent to a toothed ring.

As the rotor rotates relative to the stator, the position sensors output an AC voltage signal that allows the position of the rotor to be determined. The output AC voltage position signals have a frequency proportional to the speed of the rotor.

As stated above, the position information is used by the control devices to control the inverter switches to allow a required current to flow in the respective coils.

Coupled to each in-wheel electric motor is a vehicle controller 102 for controlling operation of the in-wheel electric motors.

The vehicle controller 102 is arranged to operate the respective in-wheel electric motors in either a drive mode or braking mode. In the drive mode the vehicle controller 102 is arranged to control the respective in-wheel motors to provide a drive torque. In the braking mode the vehicle controller 102 is arranged to control the respective in-wheel electric motors to provide a brake torque.

Incorporated in the vehicle is a brake system in which a friction brake, for example a disc or drum brake, is associated with at least one of the wheels 101 to allow a brake force to be applied to the at least one of the wheels 101. For the purposes of the present embodiment, respective friction brakes are mounted to provide a friction braking torque to each of the wheels coupled to the internal combustion engine, thereby allowing a braking force to be imparted to each of the front wheels. However, a friction brake can be associated with any number of the vehicle's wheels.

Each friction brake includes a brake assembly and a brake disc.

The brake assembly is mounted to a fixed mounting point on the vehicle 100, for example a mounting point on a part of the vehicle's suspension system.

The brake disc is mounted to a portion of a bearing block that is arranged to rotate relative to the vehicle and to which a wheel is mounted.

Each brake assembly is mounted in a position that allows the brake assemblies to apply a brake force on the brake disc, as is well known to a person skilled in the art.

The application of a brake torque by the brake assemblies is controlled via a brake pedal 130 located within the vehicle 106. The brake pedal 130 is coupled to a master cylinder assembly 140 having a piston assembly, where the piston assembly is arranged to vary hydraulic pressure in hydraulic lines that form part of the friction brake system, dependent upon a force being applied to the brake pedal 130. However, as stated above, the friction brake torque can be generated via other means, for example the use of pneumatic pressure.

The hydraulic fluid pressure in hydraulic lines, where the hydraulic lines are coupled to friction brakes is used to apply a force between a piston and a caliper that forms part of the brake assembly to cause brake pads to be brought into contact with the brake disc, thereby applying a braking force to the brake disc.

Preferably, to reduce space requirements the brake assembly has a sliding caliper arrangement for applying a braking force to the brake disc, as is well known to a person skilled in the art. However, a fixed caliper arrangement can be used.

Figure 7:
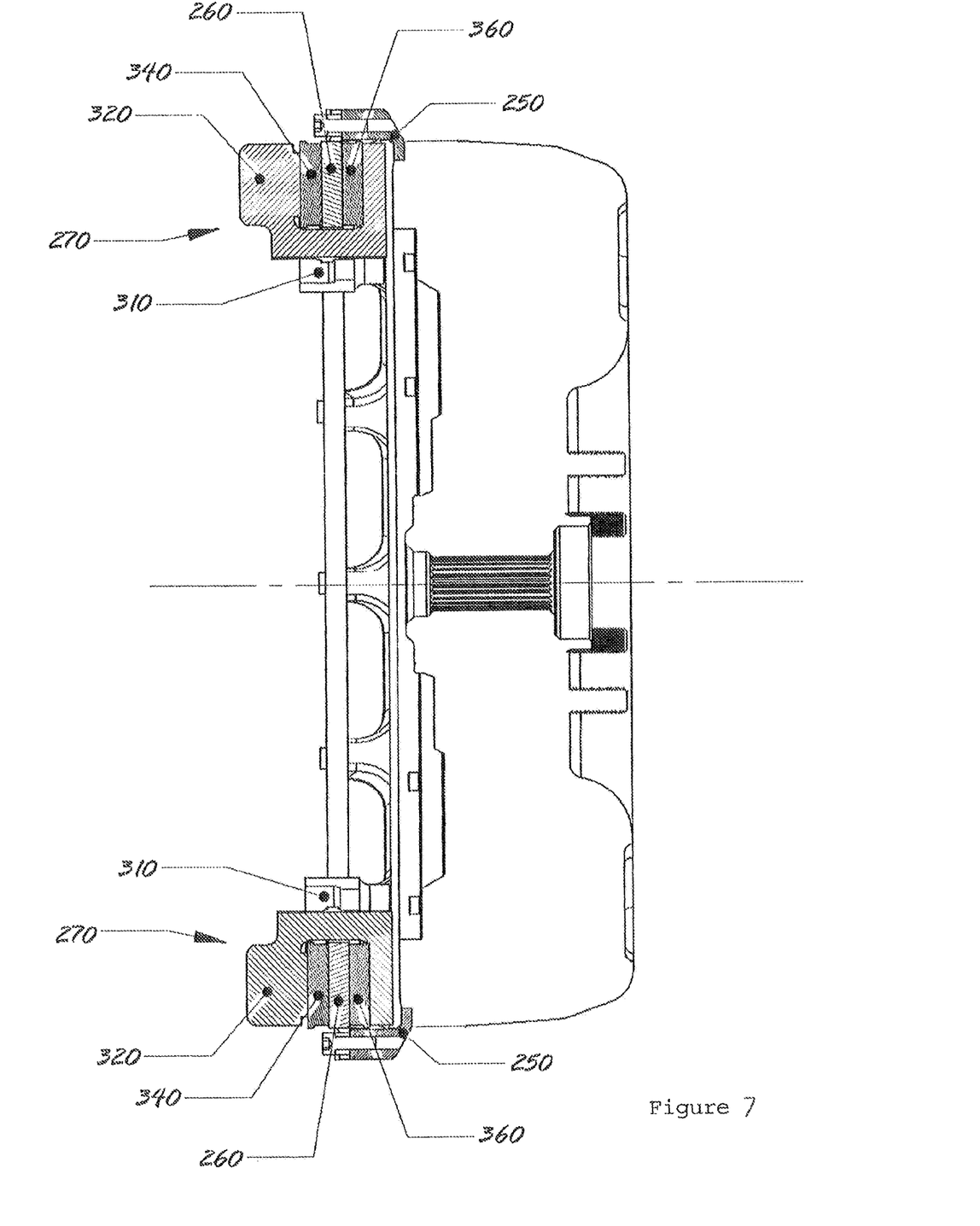
FIG. 7 illustrates an embodiment of a friction brake in accordance with an embodiment of the present invention.

In an embodiment in which a friction brake is arranged to provide a braking force to a wheel that is coupled to an in-wheel motor, a brake assembly is preferably mounted to the stator with a brake disc being mounted to the rotor, as illustrated in FIG. 7.

FIG. 7 illustrates a friction brake embodiment for use with an in-wheel electric motor where each brake assembly 270 includes a carrier 310 mounted to the vehicles suspension system. The carrier 310 is arranged to support a brake caliper 320. The brake caliper 320 is a U shaped element arranged to surround the outer edge of the brake disc 260. The brake caliper 320 is mounted to the carrier 310 in a manner that allows the brake caliper 320 to slide relative to the carrier 310 in an axial direction.

A recess is formed on an inner face of the caliper 320 facing the outer surface of the brake disc, which is mounted axially in-board of the wheel. A piston is mounted in the recess. A first brake pad 340 is mounted on the piston with a second brake pad 360 being mounted on an inner surface of the caliper 320 that faces an opposite surface of the brake disc 260 to that of the piston 330. This allows both brake pads 340, 360 to be separated from each other by the brake disc 260 with one brake pad facing one side of the brake disc and a second brake pad facing the other side of the brake disc. The brake pads 340, 360 are arranged to impart a tangential force (i.e. a braking force) to the annular disc 260 when the brake pads 340, 360 are pressed against the annular disc 260.

The vehicle controller 102 is arranged to place the respective in-wheel electric motors into the brake mode and vary the brake torque generated by the in-wheel electric motors based on a predetermined operating condition of the brake system, for example variations in the hydraulic pressure in the hydraulic lines that form part of the friction brake system, as described below. This allows the brake torque generated by the respective in-wheel motors to be dependent upon the force applied to the brake pedal 130.

Alternatively, the vehicle 100 can include a brake control unit that is coupled to the brake pedal 130 where, based on a force applied to the brake pedal 130, the brake control unit controls operation of the friction brake system and provides a control input to the vehicle controller 102 for controlling operation of the in wheel electric motor brake torque.

To allow optimum braking under a variety of different driving situations and road conditions the friction brake system includes an antilock braking system.

The antilock brake system is arranged to reduce brake force being applied to a wheel 101 if the antilock brake system makes a determination that a wheel lock condition or the onset of a wheel lock condition has occurred.

The antilock braking system within the vehicle 100 includes an electronic control module for controlling the operation of the antilock braking system and means for adjusting braking force during a wheel lock condition or an onset of a wheel lock condition. For the purpose of the present embodiment, where the vehicle 100 includes a hydraulic braking system, the means for adjusting braking force of the friction brakes is a hydraulic control unit that is arranged to control hydraulic pressure in the friction brake system.

To make a determination as to whether a wheel lock condition or the onset of a wheel lock condition is occurring during a braking manoeuvre, the antilock brake systems electronic control module analyses wheel speed information at predetermined time intervals. If the wheel speed information indicates that the wheel is decelerating at greater than a predetermined rate (e.g. at a rate greater than would normally be achievable for a vehicle) this is considered as being indicative of a wheel lock condition or the onset of a wheel lock condition and the antilock brake system reacts in a way to reduce the brake force being applied to the wheel, for example by reducing hydraulic brake pressure, thereby allowing the wheel to reaccelerate back up to the vehicle's actual speed.

To generate a wheel speed signal for input into the antilock brake system electronic control module each of the wheels includes a speed sensor, for example inductive or active speed sensors.

Inductive speed sensors typically include a permanent magnet, which is mounted adjacent to a toothed ring that rotates at road wheel speed. As the road wheel rotates an AC voltage signal is produced within the sensor that varies according to the speed of the road wheel.

With active sensors, a toothed ring is mounted in the rotating portion of the wheel bearing, which causes a DC voltage signal to be generated within the sensor as the toothed ring rotates. The DC voltage signal varies with road wheel speed.

Alternatively, for the in-wheel electric motors the output signals from the two position sensors mounted on a control device 80 can be used to generate a speed signal. For example the position sensor output signals can be rectified to generate respective alternating square waves that are shifted by approximately 90 degrees with respect to each other. By passing the two square waveforms through an exclusive OR gate a series of pulses are generated that will be proportional to the speed of the rotor relative to the stator and consequently proportional to the wheel speed.

As stated above, when in the brake mode, the vehicle controller 102 is arranged to vary the brake torque applied by one or more of the in-wheel electric motors dependent upon a predetermined operating condition of the friction braking system.

In a first embodiment, which is directed to a vehicle 100 having an existing hydraulic braking infrastructure incorporated within the vehicle 100 to support friction brakes at one or more of the wheels of the vehicle, for example for a vehicle that is retrofitted with in-wheel electric motors, the predetermined operating condition of the friction braking system may be any operating condition that is indicative of a variation in hydraulic pressure. Preferably the operating condition is associated with a wheel that is arranged to be driven by an in-wheel electric motor. For a pneumatic friction brake system the operating condition will be indicative of variations in pneumatic pressure.

Preferably the predetermined operating condition will be based on either a direct measurement of hydraulic pressure generated by the friction brake system or based upon indirect means for determining a variation in hydraulic pressure.

For example, for a wheel 101 arranged to be driven by an in-wheel electric motor, where the wheel 101 does not have an associated friction brake, the friction brake system will preferably have a brake hydraulic line associated with each in-wheel electric motor. The brake hydraulic line associated with the in-wheel electric motor is terminated at an accumulator or a dummy friction brake to allow variations in hydraulic pressure in the hydraulic lines to mimic variations in hydraulic pressure in a hydraulic line used to actuate a friction brake to provide a brake torque. Preferably the hydraulic properties in the brake hydraulic lines associated with each in-wheel electric motor is arranged to be substantially the same as those for a hydraulic line to which a functional brake caliper is attached.

In this embodiment, a pressure sensor is coupled to each respective 'dummy' hydraulic line (i.e. a hydraulic line that is not being used to actuate a friction brake to provide an actual brake torque) to measure hydraulic pressure. The measured hydraulic pressure information is provided to the vehicle controller 102. The vehicle controller 102 is arranged to map the received measured pressure information to a brake torque and controls the in wheel electric motor, to which the hydraulic line is associated, to provide the determined brake torque. If hydraulic pressure increases, this will typically be indicative of a need to increase in wheel electric motor braking torque.

The mapping of hydraulic pressure to brake torque may be achieved by any suitable means, for example via the use of a table stored in the vehicle controller 102 that correlates a given hydraulic pressure to a required brake torque or via execution of an algorithm. For example, if the brake torque applied by the electric motors is linearly dependent on the hydraulic pressure the linear relationship can be represented within either a table or a linear algorithm.

The vehicle controller 102 can be configured to vary the brake torque generated by the respective in wheel electric motors to provide a substantially constant ratio of regenerative braking to friction braking.

Similarly, as the antilock brake system can vary brake torque being applied by the friction brake system, typically by varying they hydraulic pressure generated by the brake friction system, a variation in brake torque generated by an in-wheel electric motor may be based on a predetermined operating condition of the antilock brake system. For example, a wheel lock condition of a wheel arranged to be driven by an in wheel electric motor would indicate that the brake torque being generated by an in-wheel electric motor is too great and is causing loss of traction between a road surface and the associated wheel. Accordingly, in a preferred embodiment the vehicle controller 102 is arranged to vary the brake torque applied by one or more of the in-wheel electric motors in response to a determination that the antilock brake system has identified a wheel lock condition, or an onset of a wheel lock condition, to reduce braking torque of the associated in-wheel electric motor.

The variation of the brake torque may be based on any predetermined operating condition of the antilock brake system. For example, the predetermined operating condition may be based directly on hydraulic pressure variations caused by the antilock brake system or indirectly on the operation of elements within the antilock brake system hydraulic control unit, such as valves, that would be indicative of variations in hydraulic pressure resulting from the operation of the antilock brake system.

By way of illustration, a variation of brake torque based on a predetermined operating condition directly related to hydraulic pressure variations caused by the antilock brake system will now be described.

Upon the antilock brake system detecting a wheel lock condition or an onset of a wheel lock condition for a wheel driven by an in-wheel electric motor using the associated wheel speed information, the antilock brake system hydraulic control unit reduces the hydraulic pressure in the relevant hydraulic brake line. For the hydraulic lines configured for use with a respective wheel that is arranged to be driven by an in-wheel motor the variation in hydraulic pressure in the hydraulic brake line is measured by the associated pressure sensor and provided to the vehicle controller 102. The vehicle controller 102 determines from the measured hydraulic pressure an appropriate brake torque and adjusted the brake torque generated by the relevant in wheel electric motor accordingly.

In this embodiment, the hydraulic brake lines associated with each in-wheel electric motor can be arranged to be coupled to a dummy caliper or accumulator with no friction brake being provided. In this configuration, preferably the hydraulic properties in the brake hydraulic lines associated with each in-wheel electric motor are arranged to be substantially the same as those for a hydraulic line to which a functional brake caliper is attached, thereby avoiding the need to recalibrate the ABS unit. Alternatively, the hydraulic brake lines associated with each in-wheel electric motor can be arranged to be coupled a functional brake caliper to allow the regenerative braking to be supplemented with friction braking.

In a second embodiment, in which a brake control unit is coupled to the brake pedal, a communication link is provided between the brake control unit and the vehicle controller 102 and/or the antilock brake system electronic control module and the vehicle controller 102, where the brake control unit and/or the antilock brake system electronic control module are preferably arranged to communicate to the vehicle controller 102 variations in hydraulic pressure to allow the vehicle controller 102 to determine a brake torque.

The invention claimed is:

1. A brake arrangement for a vehicle, the brake arrangement comprising:
a brake caliper;
an antilock braking system arranged to vary hydraulic or pneumatic pressure for varying a pressure to the brake caliper based upon predetermined wheel speed conditions of a first wheel to generate a first braking torque to apply to the first wheel; and
an electric motor arranged to:
generate a drive torque that is applied to a first wheel when the electric motor is placed in a drive mode of operation and a second braking torque that is applied to the first wheel when the electric motor is placed in a braking mode of operation, and
vary the second braking torque dependent upon the amount of hydraulic or pneumatic pressure provided to the brake caliper resulting from the operation of the anti-lock brake system,
wherein:
the electric motor is arranged to vary the second braking torque dependent upon the amount of hydraulic or pneumatic pressure provided to the brake caliper, and
the second braking torque is arranged to provide, during an entire time the electric motor is in the braking mode of operation, a substantially constant ratio of the second braking torque to the first braking torque.

2. A braking arrangement according to claim 1, wherein the brake system includes a pressure sensor for measuring the hydraulic or pneumatic pressure.

3. A vehicle having a braking arrangement comprising:
a first wheel;
a second wheel;
a first brake caliper coupled to the first wheel;
an antilock braking system arranged to vary hydraulic or pneumatic pressure for varying a pressure to the first brake caliper based upon predetermined wheel speed conditions of a first wheel to generate a first braking torque to apply to the first wheel, wherein the first braking torque is dependent solely on an amount of hydraulic or pneumatic pressure provided to the brake caliper; and
a first electric motor coupled to the first wheel and arranged to:
generate a drive torque that is applied to the first wheel when the first electric motor is placed in a drive mode of operation and a second braking torque that is applied to the first wheel when the electric motor is placed in a braking mode of operation, and
vary the second braking torque dependent upon the amount of hydraulic or pneumatic pressure provided to the brake caliper resulting from the operation of the anti-lock brake system,
wherein:
the first electric motor is arranged to vary the second braking torque dependent upon the amount of hydraulic or pneumatic pressure provided to the first brake caliper, and
the second braking torque is arranged to provide, during an entire time the electric motor is in the braking mode of operation, a substantially constant ratio of the second braking torque to the first braking torque.

4. A vehicle according to claim 3, further comprising:
a plurality of wheels, including the first wheel, associated with the front of the vehicle and a plurality of brake calipers including the first brake caliper, wherein each of the plurality of wheels associated with the front of the vehicle has coupled thereto an associated one of the plurality of brake calipers arranged to provide a friction brake torque to a respective wheel; and
a plurality of wheels, including the second wheel, associated with the rear of the vehicle and a plurality of electric motors including the first electric motor, wherein each of the plurality of wheels associated with the rear of the vehicle has coupled thereto an associated one of the plurality of electric motors arranged to provide, during an entire time the electric motor is in the braking mode of operation, a brake torque that is dependent upon a substantially constant ratio of regenerative braking to hydraulic pressure or pneumatic pressure provided to the first brake caliper.

5. A vehicle according to claim 4, wherein each electric motor has an associated hydraulic line coupled to a friction brake.

6. A method of performing braking on a vehicle, the method comprising:

using an electric motor to generate a drive torque that is applied to a first wheel when the electric motor is placed in a drive mode of operation and a first braking torque that is applied to the first wheel when the electric motor is placed in a braking mode of operation;

using an antilock braking system to vary a hydraulic or pneumatic pressure provided to a brake caliper based upon predetermined wheel speed conditions of the first wheel to generate a second braking torque to apply to the first wheel, wherein the first braking torque is dependent solely on an amount of hydraulic or pneumatic pressure provided to the brake caliper resulting from operation of the antilock braking system; and varying the first braking torque dependent upon the amount of hydraulic or pneumatic pressure that is being provided to the brake caliper, wherein the first braking torque is arranged to provide; during an entire time the electric motor is in the braking mode of operation, a substantially constant ratio of the second braking torque to the first braking torque.

\* \* \* \* \*